United States Patent [19]

Menko et al.

[11] Patent Number: 5,645,676
[45] Date of Patent: Jul. 8, 1997

[54] REWORK FIXTURE FOR APPLYING ADHESIVE-COATED MIRROR BUTTONS

[75] Inventors: Frederick Leo Menko, White Lake, Mich.; Joseph Paul Hoppe, Kernersville, N.C.

[73] Assignee: Dow Corning Corporation, Midland, Mich.

[21] Appl. No.: 463,606

[22] Filed: Aug. 21, 1995

[51] Int. Cl.⁶ ................................................. B30B 15/34
[52] U.S. Cl. .......................... 156/359; 156/71; 156/574; 156/583.1
[58] Field of Search ............................ 156/71, 359, 538, 156/539, 556, 574, 579, 580, 581, 583.1; 52/698; 294/65

[56] References Cited

U.S. PATENT DOCUMENTS

| 4,490,205 | 12/1984 | Warhol | 156/351 |
| 4,740,257 | 4/1988 | Halls et al. | 156/92 |
| 5,106,439 | 4/1992 | Wellings et al. | 156/71 |

Primary Examiner—James Sells
Attorney, Agent, or Firm—Robert Spector

[57] ABSTRACT

Rear view mirror mounting brackets are adhesively bonded to a windshield using a relatively small, portable rework fixture that can be temporarily secured to an automotive windshield by means of suction cups. The framework of the fixture supports a pair of movable guide rods connected to a metal block equipped with a heating element and having a surface that holds the adhesive coated mounting bracket. The guide rods are equipped with compressible springs that maintain the block and associated mounting bracket in close contact with the windshield during curing of the layer of heat-curable bonding adhesive present on the surface of the bracket that is in contact with the windshield.

3 Claims, 2 Drawing Sheets

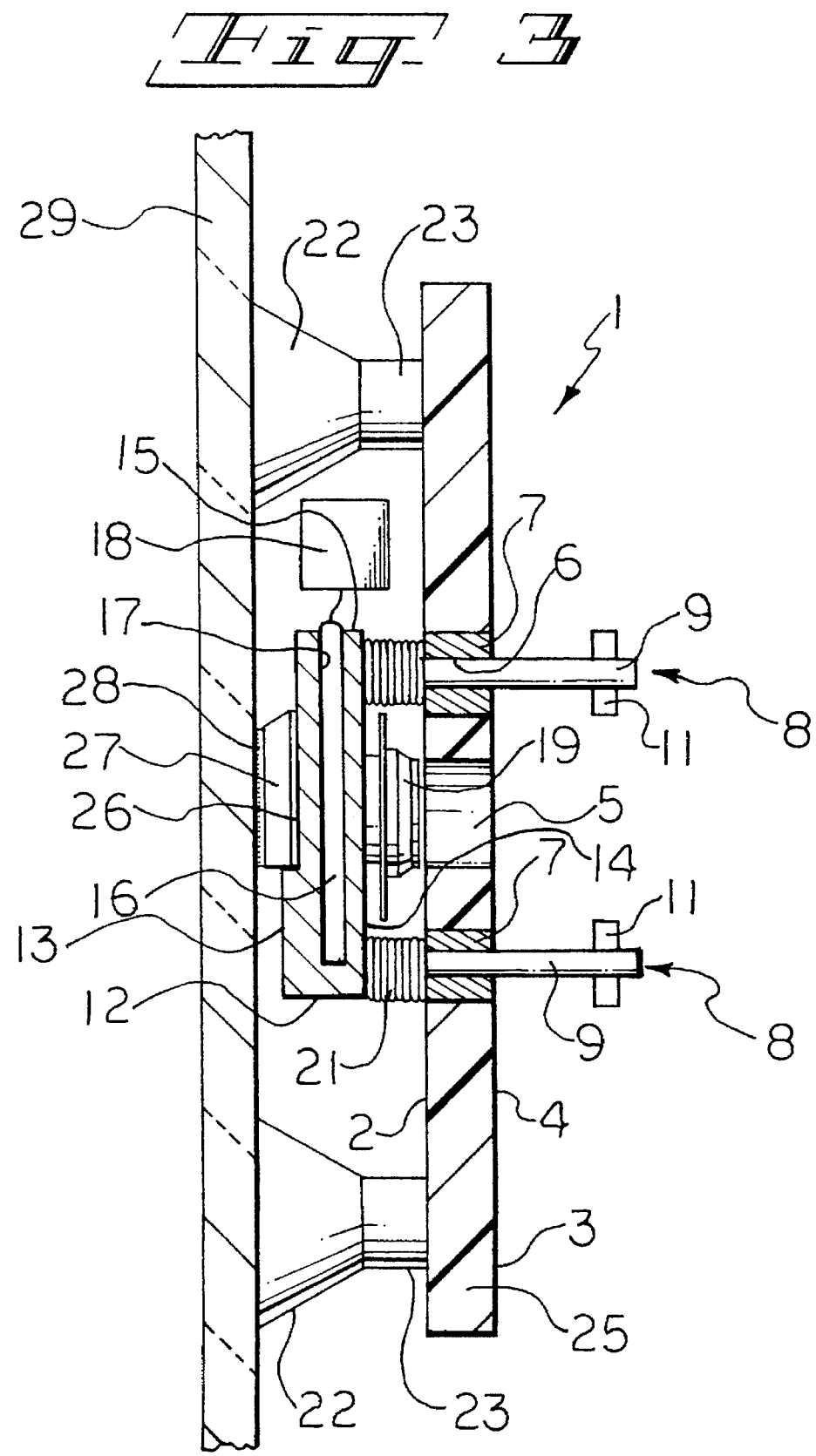

REWORK FIXTURE FOR APPLYING ADHESIVE-COATED MIRROR BUTTONS

BACKGROUND OF THE INVENTION

1. Field of the Invention

This invention relates to a tool for applying a mounting bracket for an automotive rear view mirror to a windshield. More particularly, this invention relates to a rework tool for applying and bonding a metal mounting bracket for a rear view mirror to a glass windshield using a heat curable adhesive.

2. Background Information

One method for installing rear view mirrors in automotive vehicles is by securing the base of the mirror by mechanical means such as a set screw to a metal mounting bracket. The bracket is, in turn, secured to the windshield of the vehicle by means of an adhesive.

During the life of the vehicle the adhesive forming the bond between the mounting bracket and the glass may weaken sufficiently that it will no longer support the weight of the mirror, resulting in the mirror and the associated mounting bracket becoming detached from the windshield. In some instances it may become desirable to change the location of the mounting bracket.

There are available in the market place liquid adhesives, particularly those based on cyanoacrylates, that cure rapidly under ambient conditions. These adhesives are used to reartach the mounting bracket to the windshield, however the durability of the resulting bond under the conditions encountered during operation of the vehicle may be less than can be achieved using the heat curable adhesives that are used to initially bond the mounting bracket to the windshield.

One method for initially bonding the mirror mounting bracket to the windshield uses a heat curable organic or organosilicon adhesive. To achieve maximum bonding strength between the glass and the metal bracket the mating surfaces should be pressed together while the mounting bracket is heated to accelerate curing of the adhesive. This operation is typically carried out by placing the windshield in an oven, which is relative easy when the windshield has not yet been assembled on to the frame of a vehicle.

Applying the required combination of heat and pressure to the internal surface of the windshield of a vehicle while maintaining the position of the mounting bracket and doing this in the relatively confined space available in the front seat of a vehicle presents a number of logistical problems that cannot be adequately solved using available equipment.

One objective of the present invention is to provide a tool, referred to herein as a reworking tool, that will provide the combination of heat and pressure required to adhesively bond a mirror mounting bracket to an automotive windshield yet is sufficiently small and portable to be used in the interior of an assembled vehicle.

SUMMARY OF THE INVENTION

The objectives of this invention are achieved using a relatively small, portable rework fixture that can be temporarily secured to an automotive windshield by means of suction cups. The fixture includes a framework containing guide rods that support an movable metal block equipped with a heating element and having a surface that holds an adhesive coated mirror mounting bracket. The guide rods are equipped with springs that maintain the block and associated adhesive-coated bracket in close contact with the windshield during curing of the bonding adhesive.

BRIEF DESCRIPTION OF THE DRAWINGS

FIG. 3 is a vertical cross sectional view of the rework fixture attached to an automotive windshield.

THE INVENTION

The rework fixture of the present invention comprises a unitary frame having a four-legged cross configuration. The frame has a center aperture, a front and a back.

The legs of the cross are of equal length and are spaced equidistant from one another. A suction cup is attached near the end of each leg on the side corresponding to the front of the frame. Two opposing legs of the frame contain identical openings traversing the entire thickness of the frame and located near the center aperture of the frame. The openings are equidistant from this aperture and are located along the central axis of their respective legs.

Each of the openings contains a high temperature bearing supporting a guide rod that extends beyond the front and the back of the frame. The terminals of the guide rods extending beyond the back of the frame has a stop collar attached to it and the opposite terminals are attached to a common metal block that can be heated using a heating element contained within the block. A compressible spring is mounted on each guide rod between the block and the front surface of the frame.

The front surface of the block faces the windshield during operation of the rework fixture and is configured to accommodate a mirror mounting button. The surface of the button facing the windshield contains a coating of a heat curable adhesive. A thermostat to control the temperature of the heating element is mounted on the back surface of the block.

DETAILED DESCRIPTION OF THE INVENTION

Figure 1:
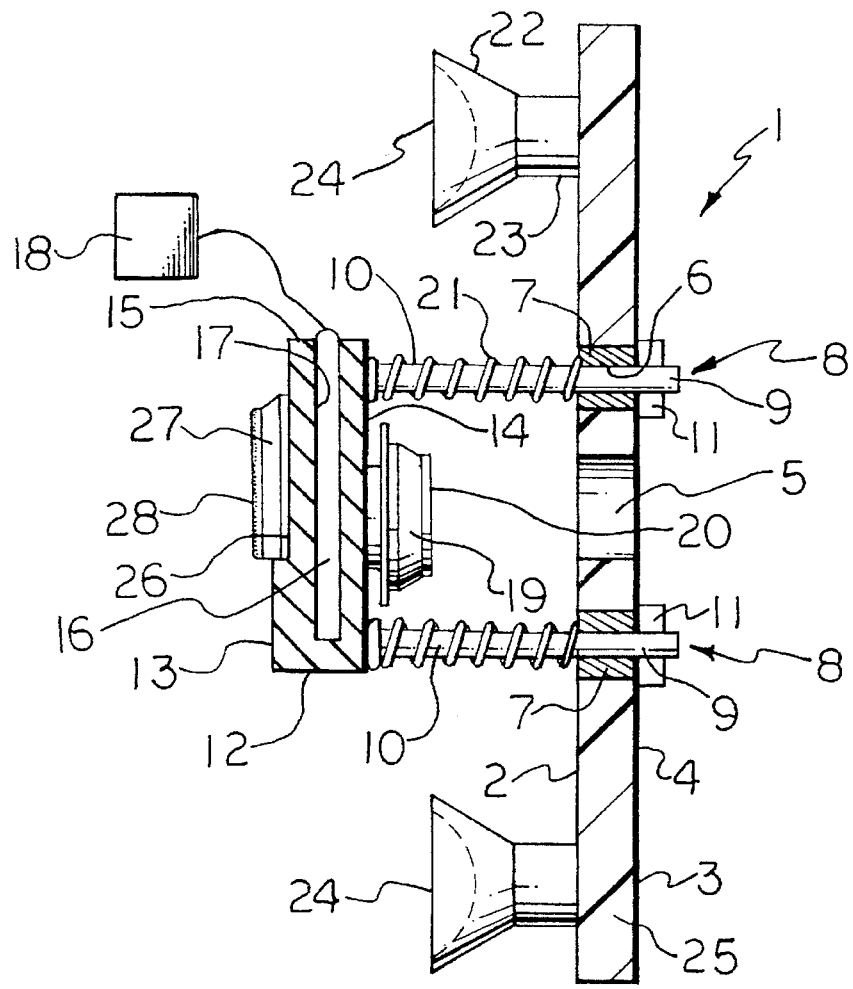
FIG. 1 of the accompanying drawings is a vertical cross sectional view through the centerline of a rework fixture of the present invention.
Figure 2:
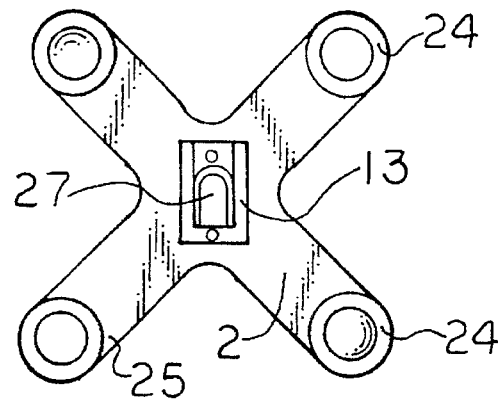
FIG. 2 is an end view showing the surfaces of the rework fixture that face the windshield during operation of the fixture.

Referring to FIGS. 1, 2, and 3 of the accompanying drawings, the rework fixture of the present invention comprises a unitary framework (1) in the shape of a cross having a front surface (2), a back surface (3), and four legs (4) of substantially equal length that are spaced equidistant from one another. Each leg is typically from 5 to about 8 inches (13 to 20 cm.)in length.

The framework (1) is formed from a rigid heat-resistant material such as wood, or a thermosetting organic resin such as an epoxy or phenolic resin. The resin can optionally contain a reinforcing agent to provide additional strength.

The framework (1) contains a central aperture (5) and two smaller holes (6) of equal diameter located along the central axes of two opposing legs (4) of the cross and equally spaced from the central aperture (5). In a preferred embodiment the central aperture (5) is circular with a diameter of 1 inch and the two smaller holes (6) are circular and 0.25 inch (0.63 cm.) in diameter.

Each of the holes (6) contains a high temperature-resistant bearing (7) supporting a movable cylindrical guide rod (8) that extends beyond the front (2) and back (3) surfaces of the framework (1) and has a near end (9) and a distal end (10). A stop collar (11) is affixed adjacent to the near end (9) of each guide rod (8). The stop collar prevents the near ends (9)

of the guide rods from passing completely through the framework (1). The guide rods (8) are preferably fabricated from a metal such as steel or aluminum and are about 3 inches (7.6 cm) long.

The two distal ends (10) are connected to a common block (12) having front (13), back (14) and top (15) surfaces. The block is preferably rectangular, measuring 3 inches (7.6 cm) in length, 1.75 inches (4.4 cm) in width with a thickness of 0.6 inches (1.6 cm).

The block (12) is fabricated from a metal that can be heated by heating elements (16) located in a well (17) formed in the interior of the block (12). The heating elements (16) are connected to a suitable power source (18) and regulated by means of a thermostat (19) located on the back surface (14) of the block. In a preferred embodiment the temperature setting of the thermostat (19) can be adjusted by means of a control (20) that is accessible through the central aperture (5).

Surrounding that portion of each guide rod (8) extending beyond the front surface (2) of the framework (1) is a compressible spring (20) that maintains the guide rods (8) in a fully extended position with the stop collar (11) in contact with the back surface (3) of the framework (1).

Four suction cups (22), each having a near end (23) secured to the framework and a distal end (24) are mounted on the front surface (2) of the framework (1) near the terminal end (25) of each leg (4). The suction cups (22) can be formed from any elastomeric material, including but not limited to natural and synthetic rubbers.

The distance (d) between the near (23) and distal (24) ends of the suction cups is slightly less than the total of the length of the fully extended guide rods (8) and the thickness of the block (12). This difference in lengths is preferably from 0.1 to 0.5 inch (0.25 to 1.3 cm).

The front surface (13) of the block (12) contains a depression (26) whose dimensions correspond to the dimensions of the adhesive-coated mirror mounting bracket (27), also referred to in this specification as a mirror button.

During operation of the rework fixture a mirror mounting bracket, is placed in the depression of the block (26). The side of the button opposite the one containing a layer of heat curable adhesive is in contact with the front surface (13) of the block.

The rework fixture is then secured to the desired location on the windshield by means of the four suction cups (22). Because the combined lengths of the block (12) and the portion of the associated guide rods (8) projecting beyond the front surface of the framework is greater than the length of the suction cups, the block (12) is forced to move toward the front face (2) of the framework (1), thereby compressing springs (20). The pressure exerted by the compressed springs keeps the adhesive coating (28) on the surface of the mounting bracket (27) in contact with the surface of the windshield (29).

The heating element (16) in the block (12) is then energized, thereby heating the block to the predetermined temperature setting of the thermostat (19), which is sufficiently high to cure the adhesive layer (28) on the mounting bracket (27). This temperature is typically from 80° to about 150° C.

When the adhesive (28) is completely cured, the supply of power to the heating element (16) is discontinued and the block allowed to cool. The framework (1) is then removed by breaking the partial vacuum holding the suction cups (22) to the windshield (29), leaving the mounting bracket (27) adhered to the windshield (29).

The base of an automotive rear view mirror can then be attached to the mounting bracket using a set screw or other suitable securing means. The mirror and associated means for securing the mirror to the mounting bracket (27) are not part of the present invention.

The layer of adhesive composition (28) on the mounting bracket can be any of the known adhesive compositions that are solid at 25° C., cure at temperatures from about 80° to about 150° C. and will cohesively bond to the mounting bracket (27) and the glass surface of the windshield (29). Suitable adhesives include but are not limited to polyvinyl butyral and organosiloxane compositions that cure by a platinum-catalyzed hydrosilation reaction.

The organosiloxane compositions typically comprise at least one polyorganosiloxane containing at least two alkenyl radicals per molecule and exhibiting the consistency of a gum at 25° C., as the crosslinking agent an organohydrogensiloxane containing at least three silicon-bonded hydrogen atoms per molecule, a platinum group metal or compound thereof as the catalyst for the crosslinking reaction and an adhesion promoter for improving the adhesion of the cured elastomer to the mounting bracket and the glass surface of the windshield.

That which is claimed is:

1. A rework fixture comprising a unitary frame having a four-legged cross configuration, said frame having a center aperture, a front and a back;

the legs of said cross being of equal length and equidistant from one another, with each leg having a near end and a distal end;

each leg having a suction cup affixed to the distal end on the front of the frame;

said frame having two identical openings therethrough located on opposing legs and near the center aperture of the frame;

each opening having a high temperature bearing located therein;

each bearing supporting a guide rod, each guide rod having a near end and a distal end, the near end of each guide rod having a stop collar attached thereto;

the distal end of each guide rod having a compressible spring slidably mounted thereon, and being attached to a common block having a top, a front, a back, and comprised of metal capable of being heated;

said block having a well in its interior which opens through the top of said block to accommodate a heating element;

the back surface of said block having mounted thereon a thermostat to control said heating element; and said block being configured on the front surface to accommodate a mirror mounting button having a surface in contact with said block and an opposing surface.

2. A fixture according to claim 1 wherein said opposing surface is coated with a layer of heat curable adhesive composition.

3. A fixture according to claim 2 wherein said adhesive composition comprises at least one polyorganosiloxane containing at least two alkenyl radicals per molecule and exhibiting the consistency of a gum at 25° C., as the crosslinking agent for said polyorganosiloxane an organohydrogensiloxane containing at least three silicon-bonded hydrogen atoms per molecule, a platinum group metal or compound thereof; as the crosslinking catalyst, and an adhesion promoter for improving the adhesion of the cured composition to said mounting button and a glass surface of a windshield.

* * * * *